(12) United States Patent
Takagi et al.

(10) Patent No.: US 7,586,579 B2
(45) Date of Patent: Sep. 8, 2009

(54) LIQUID CRYSTAL DISPLAY DEVICE AND METHODS OF MANUFACTURING THE SAME

(75) Inventors: Takashi Takagi, Kameyama (JP);
Manabu Sawasaki, Tottori (JP);
Tetsuya Fujikawa, Tottori (JP)

(73) Assignee: Sharp Kabushiki kaisha, Osaka (JP)

( * ) Notice: Subject to any disclaimer, the term of this patent is extended or adjusted under 35 U.S.C. 154(b) by 313 days.

(21) Appl. No.: 11/419,339

(22) Filed: May 19, 2006

(65) Prior Publication Data

US 2006/0285059 A1    Dec. 21, 2006

(30) Foreign Application Priority Data

May 27, 2005    (JP)    ............... 2005-155946

(51) Int. Cl.
*G02F 1/1339*    (2006.01)
*G02F 1/1337*    (2006.01)

(52) U.S. Cl. ..................... 349/156; 349/123

(58) Field of Classification Search ............... 349/155, 349/156, 123, 129, 130
See application file for complete search history.

(56) References Cited

U.S. PATENT DOCUMENTS

| | | | | |
|---|---|---|---|---|
| 4,026,637 A | * | 5/1977 | Yamazaki | ............ 349/96 |
| 6,166,797 A | * | 12/2000 | Bruzzone et al. | ............ 349/155 |
| 6,184,959 B1 | * | 2/2001 | Izumi | ............ 349/124 |
| 6,424,397 B1 | * | 7/2002 | Kuo | ............ 349/139 |
| 6,882,392 B2 | * | 4/2005 | Nam et al. | ............ 349/124 |

FOREIGN PATENT DOCUMENTS

JP    2003-317934    11/2003

* cited by examiner

*Primary Examiner*—David Nelms
*Assistant Examiner*—David Y Chung
(74) *Attorney, Agent, or Firm*—Keating & Bennett, LLP (57) ABSTRACT

On a TFT substrate, gate bus lines, data bus lines, picture element electrodes, and the like are formed, and further a first alignment film is formed of polyimide or the like. On an opposing substrate, black matrices, common electrodes, and the like formed; and further column-like spacers are formed at positions facing regions where the gate bus lines and the data bus lines cross. A second alignment film covering the surfaces of the common electrode and the spacers is formed. However, the first and second alignment films are maintained semi-setting. Thereafter, the TFT substrate and the opposing substrate are overlapped, and heated at high temperature under pressure; and the second alignment film on the apexes of the spacers and the first alignment film on the TFT substrate side are joined.

11 Claims, 9 Drawing Sheets

LIQUID CRYSTAL DISPLAY DEVICE AND METHODS OF MANUFACTURING THE SAME

CROSS-REFERENCE TO RELATED APPLICATIONS

This application is based on and claims priority of Japanese Patent Application No. 2005-155946 filed on May 27, 2005, the entire contents of which are incorporated herein by reference.

BACKGROUND OF THE INVENTION

1. Field of the Invention

The present invention relates to a liquid crystal display device, which is constituted by sealing liquid crystals between two substrates, and to methods of manufacturing the same.

2. Description of the Prior Art

Liquid crystal display devices have a feature that they are thin and light and that they have low power consumption; and, recently, they have come to be widely used for displays for various kinds of electronic devices. A usual liquid crystal display device has a structure in which liquid crystals are sealed between two substrates that are disposed to face each other. On one substrate, thin film transistors (TFTs), picture element electrodes, and the like are formed, while color filters, a common electrode, and the like are formed on the other substrate. Hereinafter, a substrate on which TFTs, picture element electrodes, and the like are formed is referred to as a TFT substrate; and a substrate, which is disposed to face the TFT substrate, is referred to as an opposing substrate. A structure formed by sealing liquid crystals between the TFT substrate and the opposing substrate is referred to as a liquid crystal panel.

Figure 1:
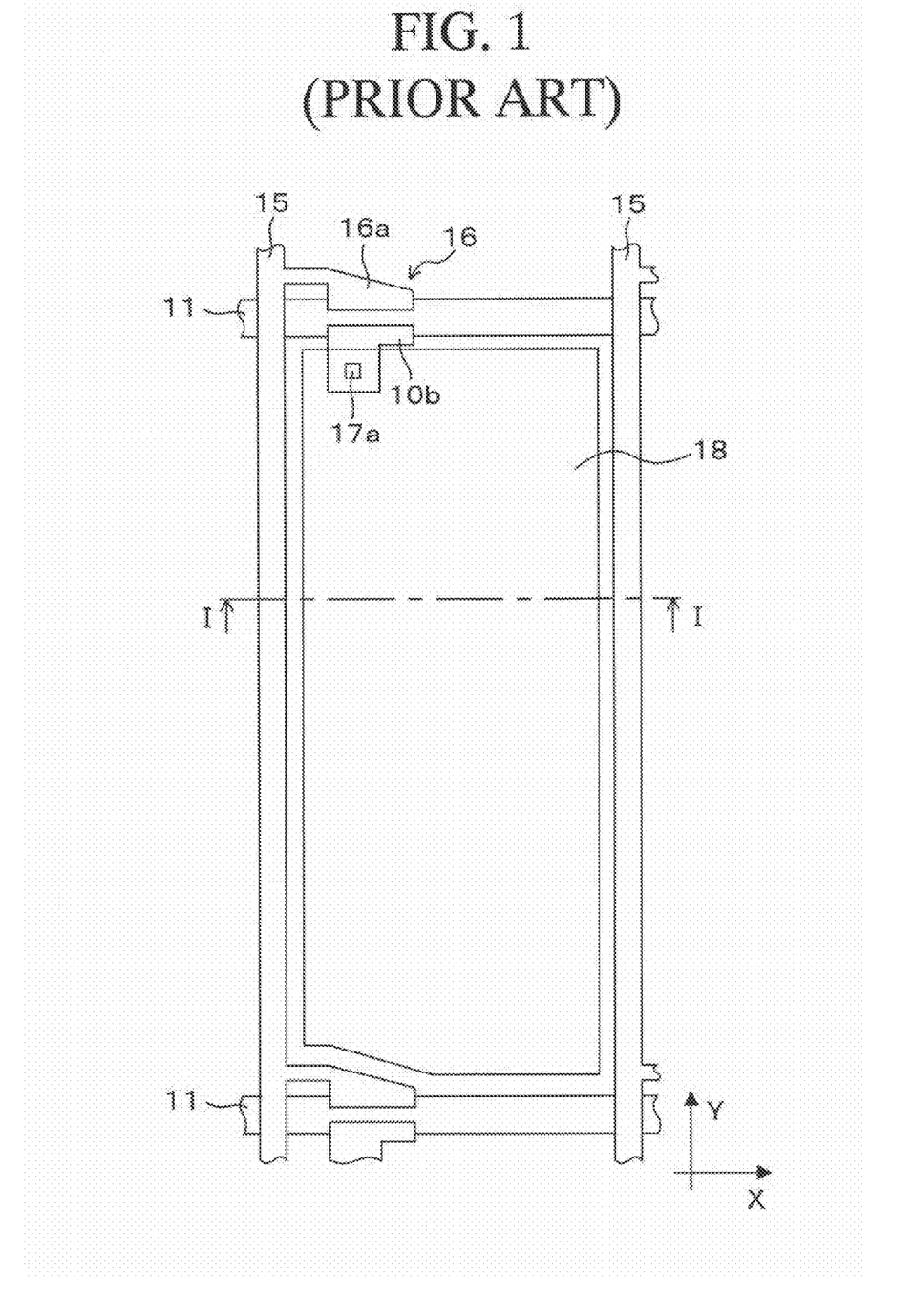
FIG. 1 is a plan view showing an example of a liquid crystal display device.
Figure 2:
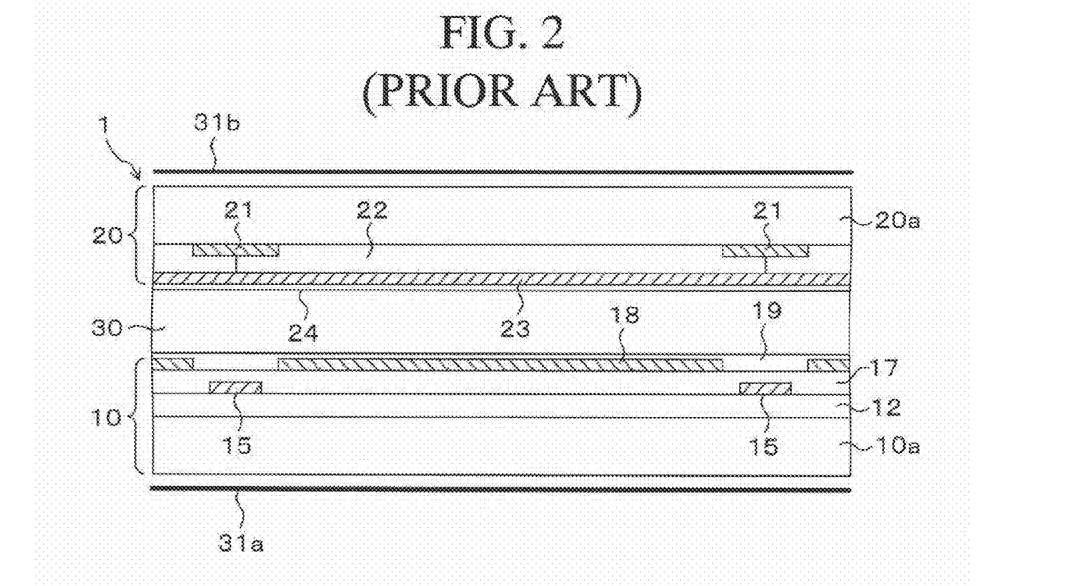
FIG. 2 is a schematic sectional view taken along line I-I of FIG. 1.

FIG. 1 is a plan view showing an example of a liquid crystal display device, and FIG. 2 is a schematic sectional view taken along line I-I of FIG. 1. Although FIG. 1 shows a region for one picture element, in practice, a large number of picture elements are arranged in matrix in the horizontal direction (in the direction of X-axis) and in the vertical direction (in the direction of Y-axis).

As shown in FIG. 2, a liquid crystal panel 1 includes a TFT substrate 10, an opposing substrate 20, and a liquid crystal layer 30 formed of liquid crystals which are sealed between these substrates 10 and 20. Here, the liquid crystal layer 30 is constituted by liquid crystals with negative dielectric anisotropy; and when a voltage is not applied, liquid crystal molecules are aligned in the direction perpendicular to the substrate surfaces.

A first polarizing plate 31a is disposed on the back side (on the lower side in FIG. 2) of the liquid crystal panel 1, and a second polarizing plate 31b is disposed on the front side (on the observer's side/on the upper side in FIG. 2) thereof. In addition, a backlight (not shown) is disposed on the back side of the liquid crystal panel 1. Here, the first polarizing plate 31a and the second polarizing plate 31b are disposed in such a way that the absorption axes of the polarizing plates are perpendicular to each other. In this case, display is a black display when a voltage is not applied.

As shown in FIG. 1, on a glass substrate 10a which becomes a base for the TFT substrate 10, a plurality of gate bus lines 11 extending in the horizontal direction and a plurality of data bus lines 15 extending in the vertical direction are formed. Rectangular regions, which are divided by the gate bus lines 11 and the data bus lines 15, are picture elements regions, respectively. The gate bus lines 11 are covered with a first insulating film 12, and the data bus lines 15 are formed on the first insulating film 12.

On the TFT substrate 10, a TFT 16 and a picture element electrode 18 are formed for every picture element region. In this example, for the TFT 16, a part of the gate bus line 11 is a gate electrode, and the drain electrode 16a is connected to the data bus lines 15. A second insulating film 17 is formed on the data bus lines 15 and the TFT 16, and the picture element electrode 18 is formed on the second insulating film 17.

The picture element electrode 18 is formed of a transparent conductive material such as indium-tin oxide (ITO), and electrically connected to a source electrode 16b of the TFT 16 through a contact hole 17a formed on the second insulating film 17. On the picture element electrode 18, a vertical alignment film 19 formed of polyimide or the like is formed.

On the other hand, on a glass substrate 20a (on the lower side in FIG. 2) which becomes a base for the opposing substrate 20, black matrices (light blocking films) 21, color filters 22, and a common electrode 23 are formed. The black matrices 21 are formed of metal such as chromium (Cr), or black resin, and placed at positions facing the gate bus lines 11, the data bus lines 15, and the TFTs 16 on the side of the TFT substrate 10. For the color filter 22, there are color filters of three different colors, i.e. red (R), green (G), and blue (B), and a color filter of any one color among red, green, and blue is placed in each picture element. The common electrode 23 is formed of a transparent conductive material such as ITO, and formed on (under in FIG. 2) the color filter 22. A surface of the common electrode 23 is covered with a vertical alignment film 24 formed of polyimide or the like.

To maintain a uniform cell gap between the TFT substrate 10 and the opposing substrate 20 (the interval therebetween), for example, bead-like spacers (not shown) with a uniform diameter are spread; and the TFT substrate 10 and the opposing substrate 20 are joined with sealant spread outside a display region (a region in which picture elements are arranged in matrix).

In the liquid crystal display device constituted in this manner, when a voltage is not applied between the picture element electrode 18 and the common electrode 23, liquid crystal molecules are aligned in the direction perpendicular to the substrate surfaces. In this case, light outputted from the backlight goes into the liquid crystal layer 30 through the first polarizing plate 31a, and blocked by the second polarizing plate 31b. In this case, display becomes a black display (dark display).

On the other hand, when a voltage is applied between the picture element electrode 18 and the common electrode 23, liquid crystal molecules are aligned in parallel to the substrate surfaces, and light outputted from the backlight comes to pass through the first polarizing plate 31a and the second polarizing plate 31b. That is, display becomes a white display (bright display). An applied voltage is controlled for each picture element, and thereby desired images can be displayed.

The inventors of the present application consider that the conventional display device described above has the following problems.

It is preferred that liquid crystals within a picture element region be operated by using only a voltage to be applied to a picture element electrode. However, in practice, an electric field occurs due to signals passing through the gate bus lines 11 and data bus lines 15; and liquid crystal molecules in the vicinities of the gate bus lines 11 and the data bus lines 15 are operated with this electric field. Hereinafter, an area, in which liquid crystal molecules are operated with signals passing through the gate bus lines 11 and the data bus lines 15, is referred to as an abnormal operation area.

Figure 3:
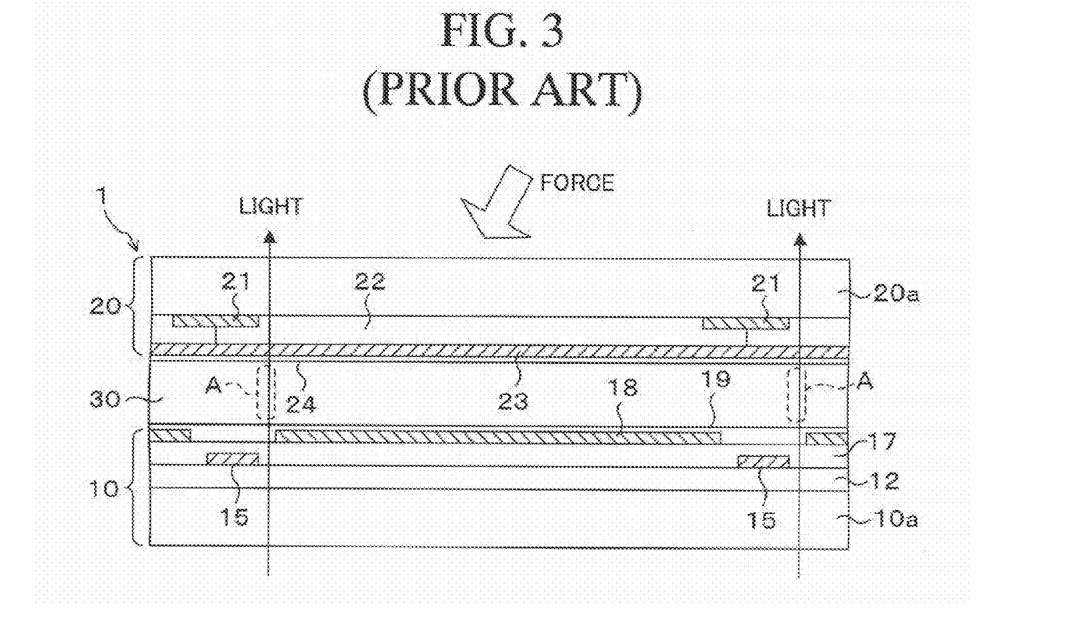
FIG. 3 is a schematic view showing a state in which a TFT substrate and an opposing substrate are displaced due to a pressure exerted thereon.

Given that the widths of the black matrices 21 are the same as those of the gate bus lines 11 and the data bus lines 15, the display quality is significantly deteriorated due to phenomena in which light passes through an abnormal operation region irrespective of being in black display, a hold after-image occurs, and the like. Thus, in general, the widths of the black matrices 21 are set to the width that are larger than those of the gate bus lines 11 and the data bus lines 15 by the total of the width of an abnormal operation region, and a process margin. However, as shown in FIG. 3, when a large force is exerted on the liquid crystal panel 1 by pressing the same with a finger, or the like, the TFT substrate 10 and the opposing substrate 20 are displaced, and abnormal operation regions A are strayed from the black matrices 21, hence deteriorating the display quality.

To prevent the above problem, it may be considered that the TFT substrate and the opposing substrate are joined with thermosetting resins scattered within a display region. For example, by coating bead-like spacers with thermosetting resin in advance, the TFT substrate and the opposing substrate can be joined with the resin coated on the spacers when setting sealant with heat. In this case, a process of applying a thermosetting resin to the TFT substrate and the opposing substrate is eliminated, and, hence, the increase of the number of processes is avoided. However, to join the TFT substrate and the opposing substrate with a sufficient strength, a large quantity of thermosetting resin is required; light is blocked from passing through a portion to which a thermosetting resin is stuck; and, hence, a problem that an aperture ratio is reduced and the screen becomes dark arises.

SUMMARY OF THE INVENTION

In view of the above described problem, an object of the present invention is to provide a liquid crystal display device and a method of manufacturing the same by which a displacement between a TFT substrate and an opposing substrate can be prevented even when a pressure is exerted on a liquid crystal panel, and favorable display quality can be constantly maintained.

The above problem is solved by the liquid crystal display device, having a first substrate and a second substrate which are placed to face each other, and liquid crystals which are sealed between the first substrate and the second substrate, which includes a first alignment film covering a surface of the first substrate on the side of the liquid crystals; column-like spacers being formed on a surface of the second substrate on the side of the liquid crystals, and maintaining a uniform distance between the first substrate and the second substrate; and a second alignment film covering surfaces of the spacers and covering a surface of the second substrate on the side of the liquid crystals; and in which the first alignment film and the second alignment film on apexes of the spacers are joined by intermolecular force bonding or chemical bonding.

In the present invention, an alignment film (second alignment film) covering apexes of the column-like spacers formed on the second substrate, and an alignment film (first alignment film) on the first substrate side are joined using intermolecular force bonding or chemical bonding. For example, a resin which becomes alignment films is applied to the first substrate and the second substrate, and thereafter the resin thus applied is pre-baked at low temperature and maintained semi-setting. Then, the apexes of the spacers are abutted to the first substrate; and the first substrate and the second substrate are overlapped, and heated at high temperature under pressure so that the first alignment film and the second alignment film are joined. Thus, a displacement between the TFT substrate and the opposing substrate can be prevented even when a force is exerted on a liquid crystal panel, and favorable display quality can be constantly maintained.

Instead of joining the alignment films, adhesives may be applied to the apexes of the spacers so that the first substrate and the second substrate are joined using the adhesives. In this case, it is preferred that the spacers be placed in regions where the gate bus lines and the data bus lines cross. For a liquid crystal display device having protrusions for alignment control, adhesive may be applied to a part of the protrusion for alignment control instead of applying the adhesives to the apexes of the spacers.

Moreover, the first substrate and the second substrate may be joined by joining resin forming the spacers and the alignment film by intermolecular force bonding or chemical bonding. For example, an alignment film (second alignment film) is formed on the second substrate; and, on the alignment film, column-like spacers are formed using resin, and maintained semi-setting. On the first substrate, an alignment film (first alignment substrate) is formed, pre-baked, and maintained semi-setting. Then, the apexes of the spacers and the first substrate are abutted; and the first substrate and the second substrate are overlapped, and heated at high temperature under pressure so that the spacers and the first alignment film are joined. Hence, a displacement between the TFT substrate and the opposing substrate can be prevented even when a force is exerted on a liquid crystal panel, and favorable display quality can be constantly maintained.

Incidentally, in Japanese Patent Application Laid-open No. 2003-317934, an organic electro luminance (EL) display device is disclosed in which a substrate where an organic EL element is formed and a substrate where a hygroscopic material is disposed are joined using adhesive applied to edges of spacers. However, in this organic EL display device, the spacers are formed of low-melting glass, and, in addition, the spacers need to be formed to surround organic EL elements for preventing the deterioration of the organic EL elements due to damp. Therefore, this structure cannot be applied to liquid crystal display devices.

DESCRIPTION OF THE PREFERRED EMBODIMENTS

The present invention is described, hereinafter, with reference to the accompanying drawings.

First Embodiment

Figure 4:
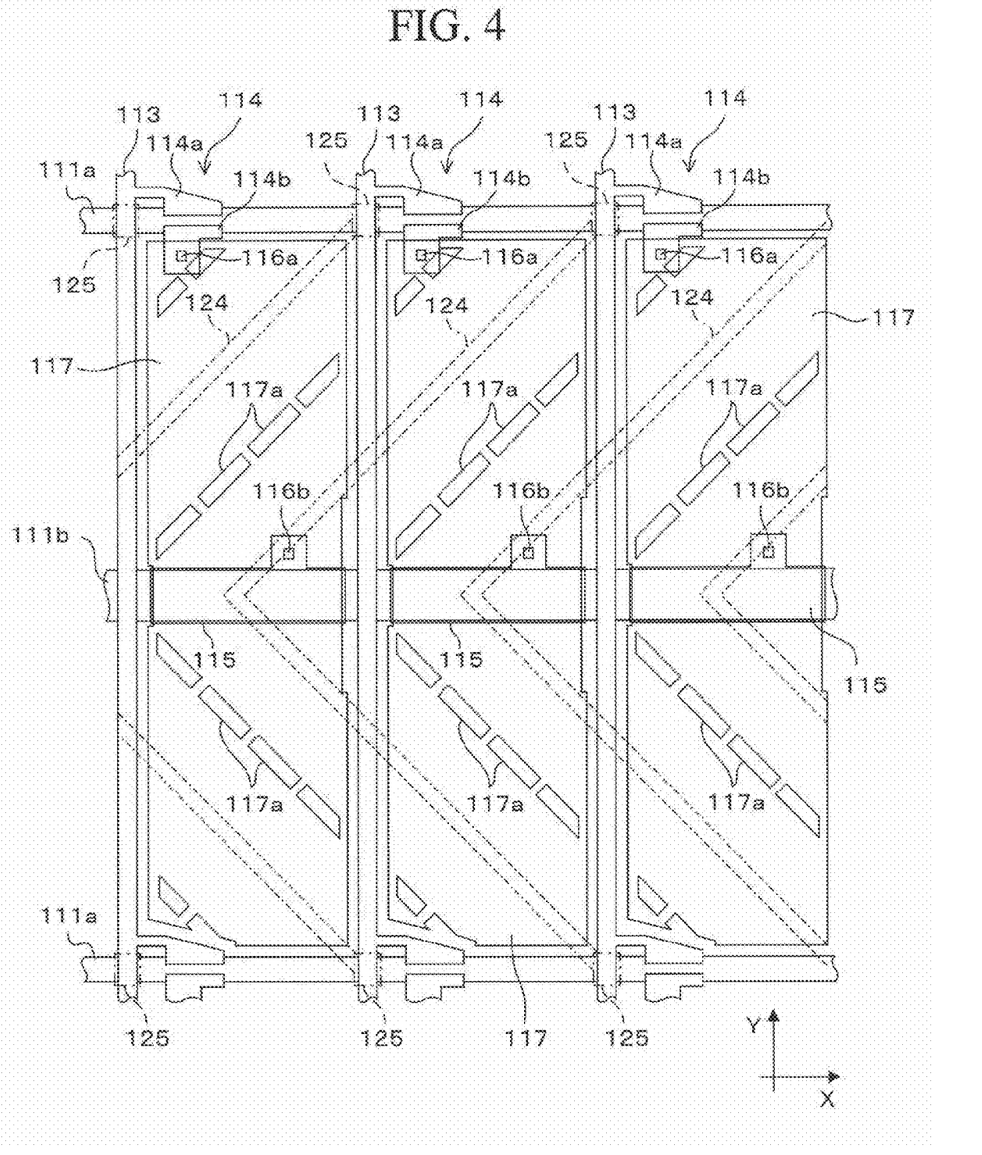
FIG. 4 is a plan view showing a liquid crystal display device of a first embodiment of the present invention.
Figure 5:
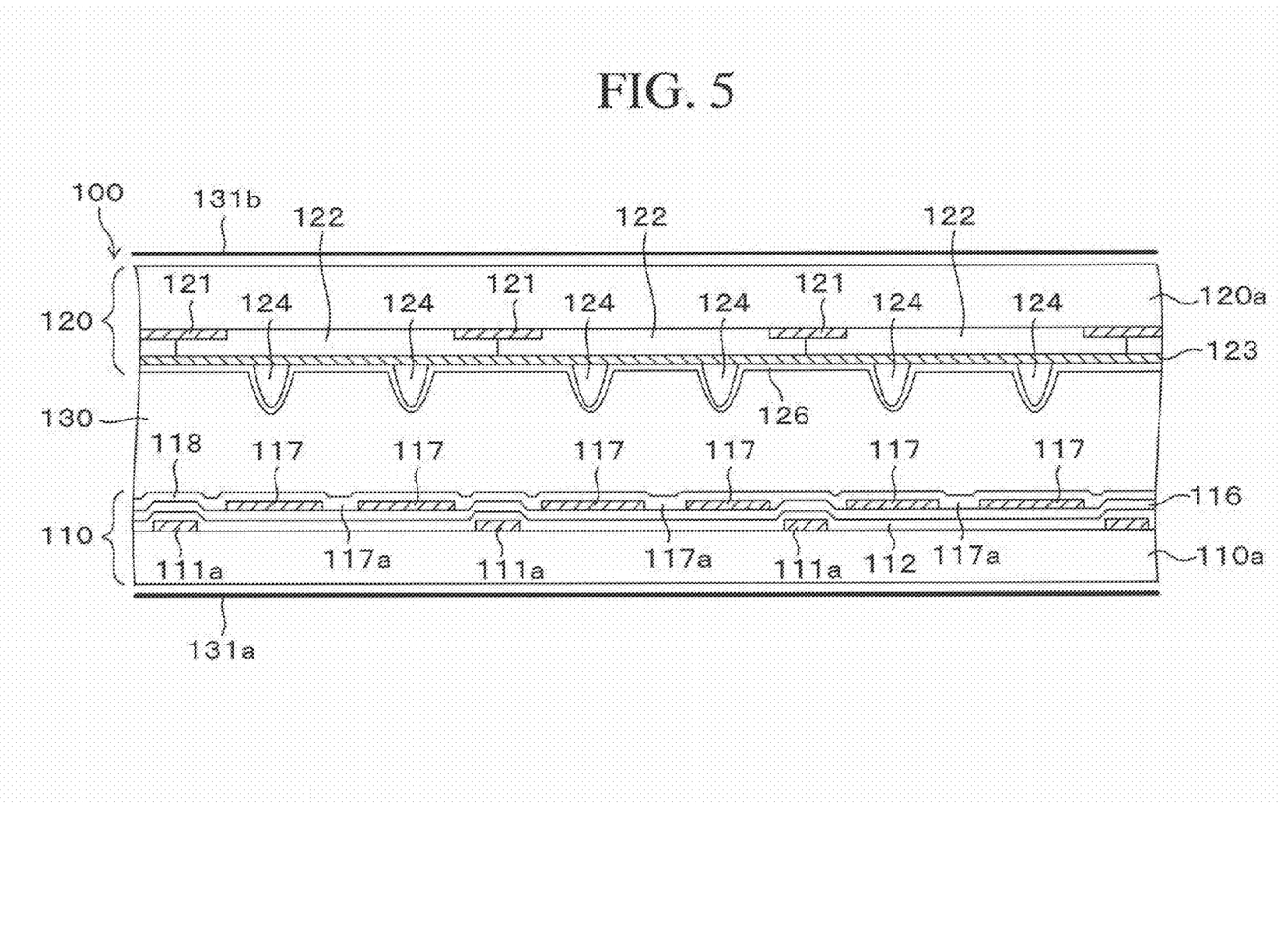
FIG. 5 is a schematic sectional view of the liquid crystal display device of the same.

FIG. 4 is a plan view showing a liquid crystal display device of a first embodiment of the present invention, and FIG. 5 is a schematic sectional view of the liquid crystal display device of the same. The present embodiment shows an example in which the present invention is applied to a multi-domain vertical alignment (MVA). In FIG. 4, although regions corresponding to three picture elements are shown, in practice, a large number of picture elements are aligned in matrix in the horizontal (in the direction of X-axis) and the vertical direction (in the direction of Y-axis).

As shown in FIG. 5, a liquid crystal panel 100 includes a TFT substrate 110, an opposing substrate 120, and a liquid crystal layer 130 formed of liquid crystals having negative dielectric anisotropy which is sealed between the TFT substrate 110 and the opposing substrate 120. A first polarizing plate 131a is disposed on the back side (on the lower side in FIG. 5) of the liquid crystal panel 100, and on the front side (on the upper side in FIG. 5) thereof, a second polarizing plate 131b is disposed. These polarizing plates 131a and 131b are disposed in such a way that the polarizing axes are perpendicular to each other. In addition, a backlight (not shown) is disposed on the back side of the liquid crystal panel 100.

As shown in FIG. 4, on the TFT substrate 110, a plurality of gate bus lines 111a extending in the horizontal direction, and a plurality of data bus lines 113 extending in the vertical direction are formed. Rectangular regions divided by these gate bus lines 111a and data bus lines 113 are picture element regions, respectively. On the TFT substrate 110, an auxiliary capacitance bus line 111b is formed which is placed in parallel to the gate bus lines 111a and which crosses the picture element regions over the middles thereof.

The gate bus lines 111a and the auxiliary capacitance bus line 111b are formed on a glass substrate 110a which becomes a base for the TFT substrate 110. A first insulating film 112 is formed on the gate bus lines 111a and the auxiliary capacitance bus line 111b, and the data bus lines 113 are formed on the first insulating film 112.

Furthermore, on the TFT substrate 110, a TFT 114, an auxiliary capacitance electrode 115, and a picture element electrode 117 are formed for each picture element region. In the present embodiment, the TFT 114 uses a part of the gate bus line 111a as a gate electrode, and a drain electrode 114a is connected to the data bus line 113.

The auxiliary capacitance electrode 115 is disposed to face the auxiliary capacitance bus line 111b with the first insulating film 112 interposed therebetween. An auxiliary capacitance is constituted by the auxiliary capacitance electrode 115, the auxiliary capacitance bus line 111b, and the first insulating film 112 interposed therebetween. This auxiliary capacitance is connected to the picture element electrode 117 in parallel thereto, and thus a decrease of the voltage of the picture element electrode 117, which occurs while the TFT 114 is being turned off, is suppressed.

On the data bus lines 113, the TFT 114, and the auxiliary capacitance electrode 115, a second insulating film 116 is formed; and on this second insulating film 116, the picture element electrode 117 is formed. This picture element electrode 117 is formed of a transparent conductive material such as ITO, and electrically connected to a source electrode 114b of the TFT 114, and the auxiliary capacitance electrode 115 through contact holes 116a and 116b formed in the second insulating film 116.

In addition, in the present embodiment, a plurality of slits 117a are provided to the picture element electrode 117 as alignment control structures. As shown in FIG. 4, these slits 117a are provided along zigzag lines bending on the gate bus lines 111a and the auxiliary capacitance bus line 111b. A vertical alignment film 118 formed of polyimide or the like is formed on the picture element electrode 117.

On the other hand, the opposing substrate 120 includes a glass substrate 120a which becomes a base, black matrices (light blocking films) 121, color filters 122, and a common electrode 123. The black matrices 121 are disposed at positions facing the gate bus lines 111a, the data bus lines 113, and the TFT 114 on the side of the TFT substrate 120. The widths of the black matrices 121 are set to the widths that are larger than those of the gate bus lines 111a and the data bus lines 113 by the total of the width of an abnormal operation region, and a process margin.

For the color filter 122, there are color filters of three different colors, i.e. red (R), green (G), and blue (B); and a color filter 122 of any one color among red (R), green (G), and blue (B) is placed at a position facing the picture element electrode 117 for each picture element. In the present embodiment, one pixel is constituted by three picture elements, i.e. a red picture element, a green picture element, and a blue picture element, the picture elements neighboring each other in the horizontal direction, and thereby displaying of various colors becomes possible.

The surfaces of the color filter 122 are covered with the common electrode 123 formed of a transparent conductive material such as ITO. As shown in FIG. 5, on the common electrode 123 (on the lower side in FIG. 5), bank-like protrusions 124 are formed as alignment control structures. The protrusions 124 are formed of, for example, a dielectric material such as photoresist, and disposed between the lines of the slits 117a of the picture element electrodes 117 as shown in FIG. 4.

Incidentally, on the opposing substrate 120, column-like spacers 125 are disposed at positions corresponding to portions where the gate bus lines 111a and the data bus lines 113 cross each other, and these spacers 125 maintain the uniform cell gap (the thickness of the liquid crystal layer 130). These spacers 125 are, for example, formed of photoresist. The surfaces of the common electrode 123, the protrusions 124, and the spacers 125 are covered with a vertical alignment film 126 formed of polyimide.

Figure 6:
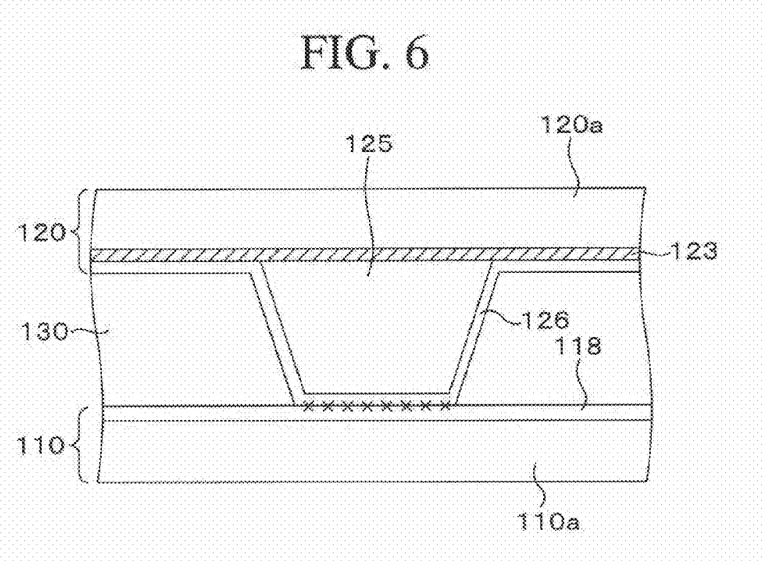
FIG. 6 is a schematic view showing a state in which molecules forming an alignment film on apexes of spacers are bridged to and joined with molecules forming an alignment film on the side of a TFT substrate in the liquid crystal display device of the first embodiment.

In the present embodiment, as shown in a schematic view of FIG. 6, molecules forming the alignment film 126 at an apex of a spacer 125 are bridged to and joined with molecules forming an alignment 118 on the side of the TFT substrate 110; and thus the TFT substrate 110 and the opposing substrate 120 are not displaced even when a force is exerted with a finger or the like.

In the liquid crystal display device of the present embodiment constituted as in the above manner, when a voltage is not applied between the picture element electrode 117 and the common electrode 123, liquid crystal molecules are aligned in the direction perpendicular to the substrate surfaces. However, liquid crystal molecules in the vicinities of the protrusions 124 are aligned in the direction perpendicular to the surfaces of the protrusions 124. In this case, light outputted from the backlight goes into the liquid crystal layer 130 through the first polarizing plate 131a, and is blocked with the second polarizing plate 131b. In this case, hence, display becomes a black display (dark display).

Figure 7:
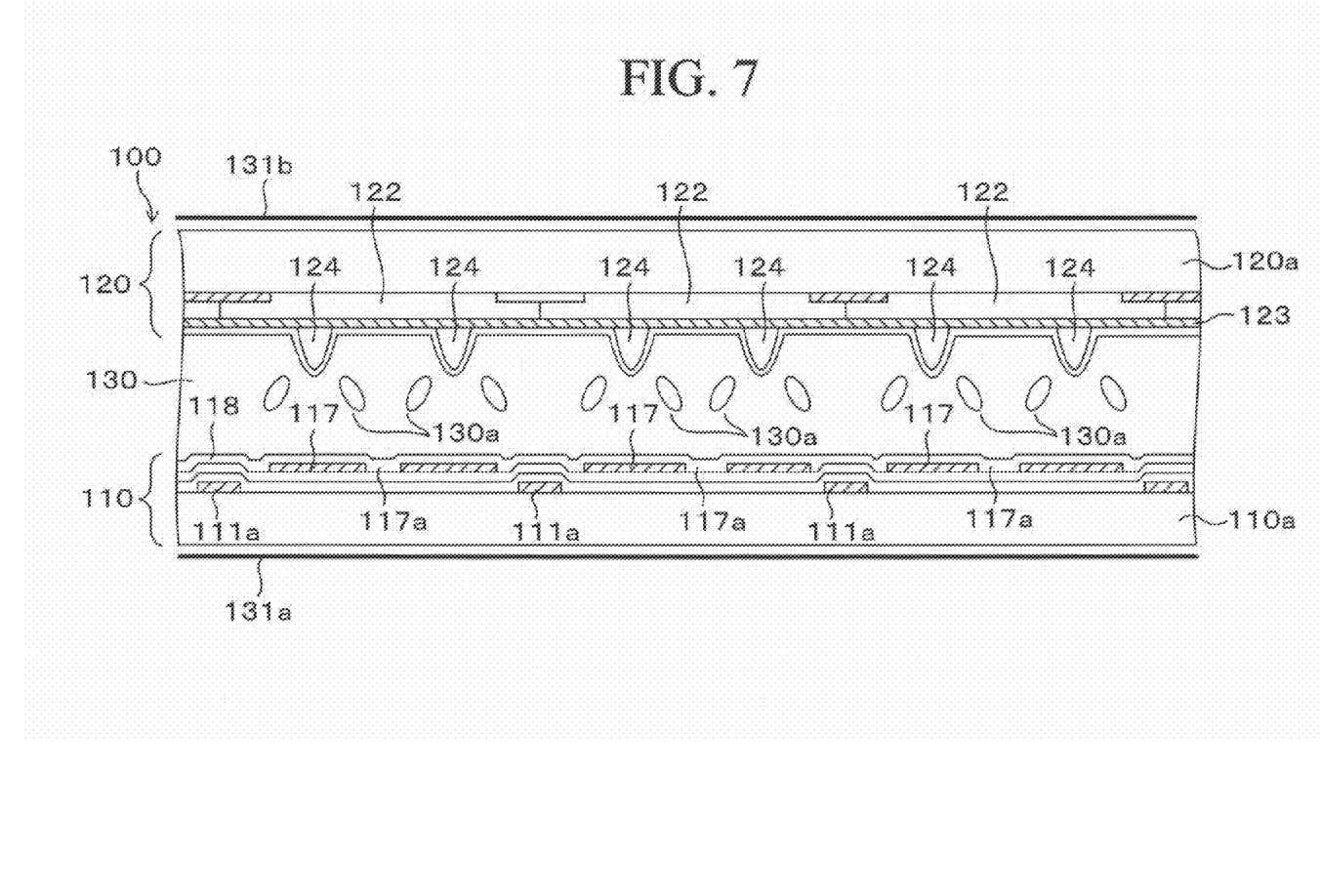
FIG. 7 is a schematic view showing a state in which liquid crystal molecules are inclined at angles in accordance with a voltage of a display signal.

When a scanning signal supplied to the gate bus lines 111a comes to be active, the TFT 114 is turned on, and a display signal supplied to the data bus lines 113 is transmitted to the picture element electrode 117. Therefore, as shown in FIG. 7, liquid crystal molecules 130a are inclined at angles depending on the voltage of a display signal, and light outputted from the backlight comes to pass through the first polarizing plate 131a and the second polarizing plate 131b. At this time, the liquid crystal molecules 130a are aligned in the directions opposite to each other on both sides of the slits 117a and the protrusions 124; and that is, so-called multi-domains are achieved, and hence favorable viewing angle characteristics can be achieved.

A method of manufacturing the liquid crystal display device of the present embodiment is described, hereinafter, with reference to the drawings of FIGS. 4 and 5.

First, a method of manufacturing the TFT substrate 110 is described. On one surface (the upper surface in FIG. 5) of the glass substrate 110a which becomes a base for the TFT substrate 110, for example, a first metal film having a laminated structure of aluminum (Al)-titan (Ti) is formed by sputtering. This first metal film is patterned by photolithography, and the gate bus lines 111a and the auxiliary capacitance bus lines 111b are formed.

Next, the fist insulating film (gate insulating film) 112 formed of, for example, SiO2 is formed on the entire upper surface of the glass substrate 110a by a chemical vapor deposition (CVD). On a predetermined region of the first insulating film 112, a semiconductor film (an amorphous silicon film or a polysilicon film: not shown) which becomes an active layer for the TFT 114 is formed. Thereafter, on the entire upper surface of the glass substrate 110a, for example, an SiN film is formed; and this SiN film is patterned by photolithography, and a channel protection film (not shown) is formed on a region of the semiconductor film, which serves as a channel.

Next, on the entire upper surface of the glass substrate 110a, an ohmic contact layer is formed which is made of a semiconductor including impurities in high density; and on the ohmic contact layer, a second metal film having, for example, a laminated structure of Ti—Al—Ti is formed. The ohmic contact layer and the second metal film are patterned by photolithography so that the data bus lines 113, the drain electrode 114a, the source electrode 114b, and the auxiliary capacitance electrode 115 are formed.

Next, on the entire upper surface of the glass substrate 110a, the second insulating film 116 formed of, for example, SiO2, SiN, resin, or the like is formed. On the second insulating film 116, the contact hole 116a leading to the source electrode 114b and the contact hole 116b leading to the auxiliary capacitance electrode 115 are formed by photolithography.

Next, an ITO film is formed on the entire upper surface of the glass substrate 110a by sputtering. Then, this ITO film is patterned by photolithography, and the picture element electrode 117 having the slits 117a is formed. This picture element electrode 117 is electrically connected to the source electrode 114b through the contact hole 116a, and connected also to the auxiliary capacitance electrode 115 through the contact hole 116b.

To the entire upper surface of the glass substrate 110a, polyimide for example is applied in thickness of 0.1 µm for example, and pre-baked, thereafter, at a temperature of approximately 60 degrees Celsius. Thus, the TFT substrate 110 is completed.

Next, a method of manufacturing the opposing substrate 12 is described. The black matrices 121 made of metal such as Cr, or a black resin are formed on (under in FIG. 5) the glass substrate 120a which becomes a base for the opposing substrate 120.

Subsequently, the color filter 122 is formed on the glass substrate 120a by using a red photosensitive resin, a green photosensitive resin, and a blue photosensitive resin. The color filter 122 of any one color among red, green, and blue is placed for each picture element region.

Next, the common electrode 123 formed of ITO is formed on the color filter 122 by sputtering. Then, photoresist is applied to the common electrode 123, and a photoresist film is formed. The photoresist film is exposed through a predetermined exposure mask, and a development process is performed thereon; and thereby the bank-like protrusions 124 of approximately 2 µm high and the spacers 125 of approximately 3.5 µm are formed. In this case, by making the size of the spacers 125 larger than the widths of protrusions 124, it is possible to make the spacers 125 higher than the protrusions 124. Incidentally, the protrusions 124 and the spacers 125 may be formed separately. Furthermore, resin films or the like may be formed under the spacers 125 in advance so that the respective heights of the spacer 125 and the protrusion 124 are different.

Next, to the entire upper surface of the glass substrate 120a, for example, polyimide is applied in thickness of 0.1 µm, and pre-baked, thereafter, at a temperature of approximately 60 degrees Celsius. Thus, the opposing substrate 120 is completed.

Figure 8:
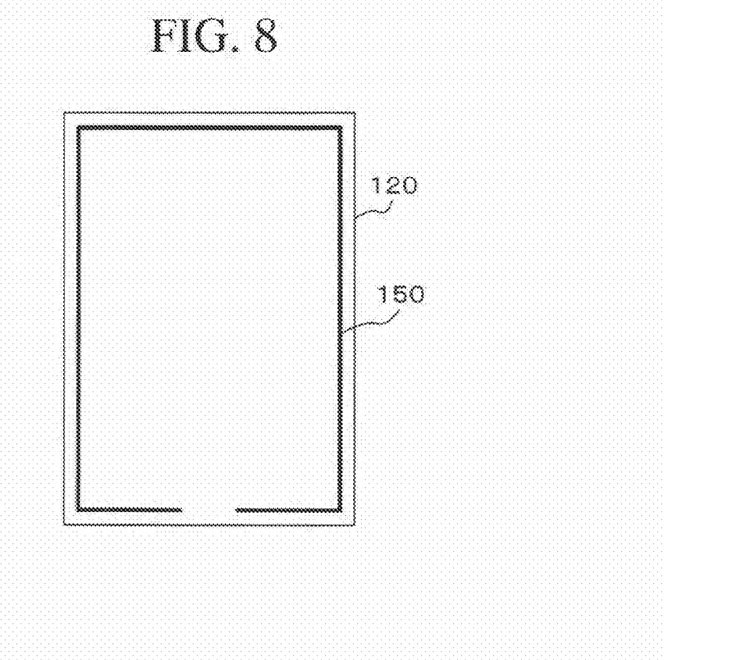
FIG. 8 is a schematic view showing a state in which a sealant is applied to an opposing substrate.

Next, as shown in FIG. 8, a sealant 150 is applied along the periphery of a display region of one (the opposing substrate 120 in FIG. 8) of the TFT substrate 110 and the opposing substrate 120. At this time, the applying of the sealant 150 is performed in order not to apply the sealant to a portion which becomes a liquid crystal injection port for injecting liquid crystals in a post-process.

Subsequently, to make an empty panel, the TFT substrate 110 and the opposing substrate 120 are overlapped in such a way that the surfaces thereof on which the alignment films 118 and 126 are formed stay inside the two substrates. This empty panel is put into a vacuum chamber, and heated at a temperature of 220 degrees Celsius under pressure. While the sealant 150 becomes set, molecules constituting the alignment films 118 and 126 are bridged by heat at edges of the spacers 125, and both alignment films are firmly joined with each other by chemical bonding and physical bonding due to intermolecular forces.

Figure 9:
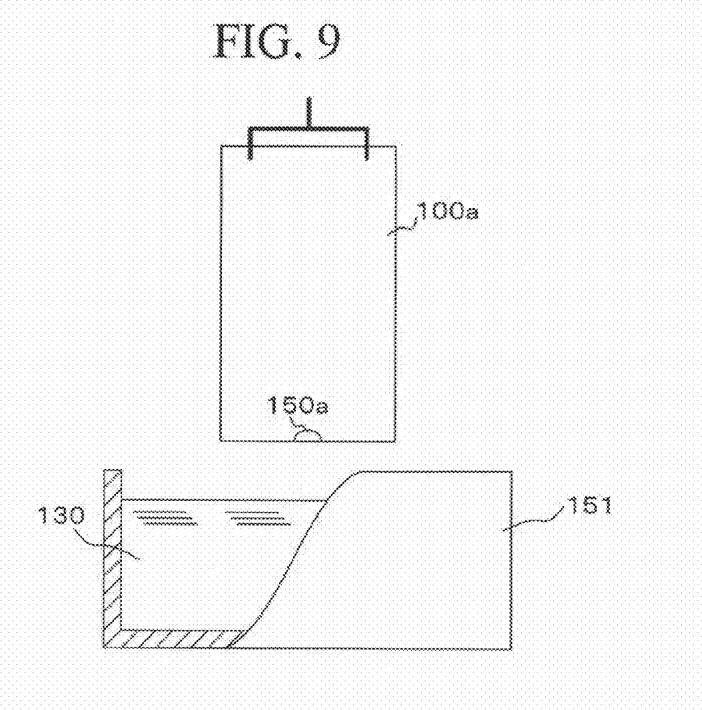
FIG. 9 is a schematic view showing a method of injecting liquid crystals into an empty panel.

Next, as shown in FIG. 9, a container 151 with liquid crystals 130 inside is prepared. Inside the vacuum chamber, a liquid crystal injection port 150a of the empty panel 100a is put into the liquid crystals 130, and the pressure in the chamber is put back to atmospheric pressure. Then, the liquid crystals come into the panel 100a due to the pressure difference between the pressure inside the panel 100a and that outside the same. After the panel 100a is sufficiently filled with liquid crystals, excessive liquid crystals in the panel 100a are squeezed out of the panel 100a by putting two plates with the panel 100a interposed therebetween, and the liquid crystal injection port 150a is sealed with a resin. Thus, the liquid crystal panel 100 is completed.

Next, the polarizing plates 131a and 131b are joined with the liquid crystal panel 100 on the back side and front side thereof; a driving circuit is connected; and thereafter a backlight is fastened on the back side. In this way, the liquid crystal display device of the present embodiment is completed.

Heretofore, polyimide which becomes alignment films has been applied to the surfaces of a TFT substrate or an opposing substrate, and thereafter they have been heated so that an alignment film is sufficiently set. In contrast, in the present embodiment, as has been described above, polyimide which becomes alignment films is applied to the TFT substrate 110 and the opposing substrate 120, and thereafter pre-baked at low temperature (60 degrees Celsius). Then, when the TFT substrate 110 and the opposing substrate 120 are attached with sealant 150, they are heated at high temperature (220 degrees Celsius) so that polyimide (alignment film) on the side of the TFT substrate 110 and polyimide (alignment film) on the side of the opposing substrate 120 are bridged and joined. Accordingly, even when a force is exerted on the liquid crystal panel 100 with a finger or the like, the TFT substrate 110 and the opposing substrate 120 are not displaced, and favorable display quality can be constantly maintained.

Incidentally, in the present embodiment, the column-like spacers 125 formed using photoresist are placed on portions where the gate bus lines 111a and the data bus lines 113 cross. Since light is blocked by the black matrices 121 in regions where the column-like spacers 125 are disposed, the reduction of an aperture ratio which occurs due to the presence of the column-like spacers 125 is avoided.

Furthermore, according to the method of the present embodiment, it is not necessary to newly add the processes of applying or setting adhesive, and hence the increase of manufacturing processes is avoided.

Incidentally, in the above described embodiment, although a thermosetting resin is used as a sealant, an ultraviolet curing resin can be also used as a sealant as a matter of course. However, in that case, it is necessary to separately perform a process in which sealant is set, and a process in which alignment films are joined.

Second Embodiment

A second embodiment of the present invention is described hereinafter. The present embodiment is different from the first embodiment only in a method of joining alignment films, and however other constitutions are the same as those of the first embodiment, hence omitting description for the same part.

In the first embodiment, polyimide which becomes the alignment films 118 and 126 is applied to the TFT substrate 110 and the opposing substrate 126, and thereafter pre-baked at low temperature (60 degrees Celsius). Then, the sealant 150 is applied to the TFT substrate 110 and the opposing substrate 120, and those two substrates are overlapped; and thereafter a heat treatment is performed thereon at high temperature (220 degrees Celsius) under pressure, and alignment films are joined.

In contrast, in the second embodiment, polyimide which becomes alignment films is applied to the opposing substrate; and the opposing substrate is thereafter pre-baked at low temperature (60 degrees Celsius), and further heated at high temperature (220 degrees Celsius) so that the alignment film is sufficiently set before joining the opposing substrate with the TFT substrate. On the other hand, for the TFT substrate side, as in the first embodiment, polyimide which becomes alignment films is applied to the TFT substrate, and thereafter the TFT substrate is pre-baked at low temperature (60 degrees Celsius); and however the TFT substrate is not processed by heat at high temperature before joining with the opposing substrate.

Figure 10:
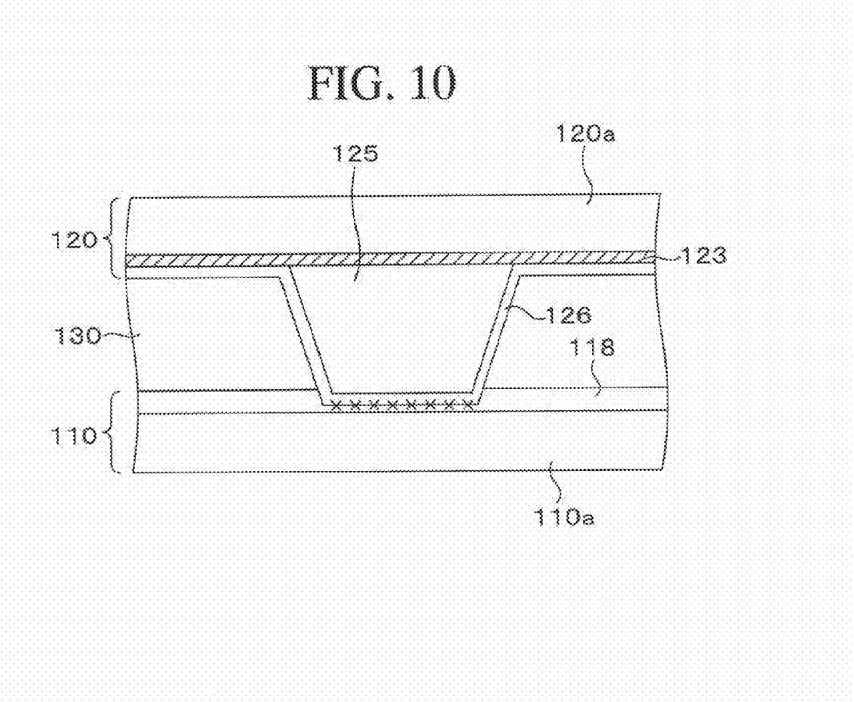
FIG. 10 is a view which shows a liquid crystal display device of a second embodiment of the present invention and which shows a state in which an alignment film on apexes of spacers and an alignment film on the side of a TFT substrate are joined.

A sealant is applied to the TFT substrate and the opposing substrate; and these substrates are overlapped, and processed in vacuum by heat at high temperature (220 degrees Celsius) under pressure. Hence, as shown in a schematic view of FIG. 10, this makes an edge of a spacer 125 be pressed into the alignment film 118 on the side of the TFT substrate 110 so that the alignment films are joined by intermolecular forces. In FIG. 10, the drawings of gate bus lines, data bus lines, insulating films, black matrices, color filters, and the like are omitted.

Then, as in the same way as that of the first embodiment, liquid crystals are sealed between the TFT substrate 110 and the opposing substrate 120; polarizing plates, a backlight, and the like are fastened; and, thus, a liquid crystal display device of the present embodiment is completed.

In the present embodiment, the same effects as those of the first embodiment can be obtained; and in addition, since the edges of the spacers 125 are pressed into the alignment film 118 on the side of the TFT substrate 110, another effect can be obtained that even when a large force is externally exerted, a displacement for the TFT substrate 110 and the opposing substrate 120 can be more securely avoided.

Third Embodiment

A third embodiment of the present invention is described hereinafter. The present embodiment is different from the first embodiment in a method of joining a TFT substrate and an opposing substrate on portions where spacers are disposed, and other constitutions are the same as those of the first embodiment, hence omitting description for the same part.

In the present embodiment, polyimide which becomes alignment films is applied to a TFT substrate and an opposing substrate; and thereafter these substrates are processed (pre-baked) by heat at low temperature (60 degrees Celsius), and processed by heat at high temperature (220 degrees Celsius) so that alignment films are sufficiently set. To the edges of spacers on the opposing substrate, adhesives (thermosetting resins) are applied using an ink-jet printer. Adhesives may be also applied, using an ink-jet printer, to the TFT substrate at positions (portions where gate bus lines and data bus lines cross) where spacers contact with the TFT substrate.

Figure 11:
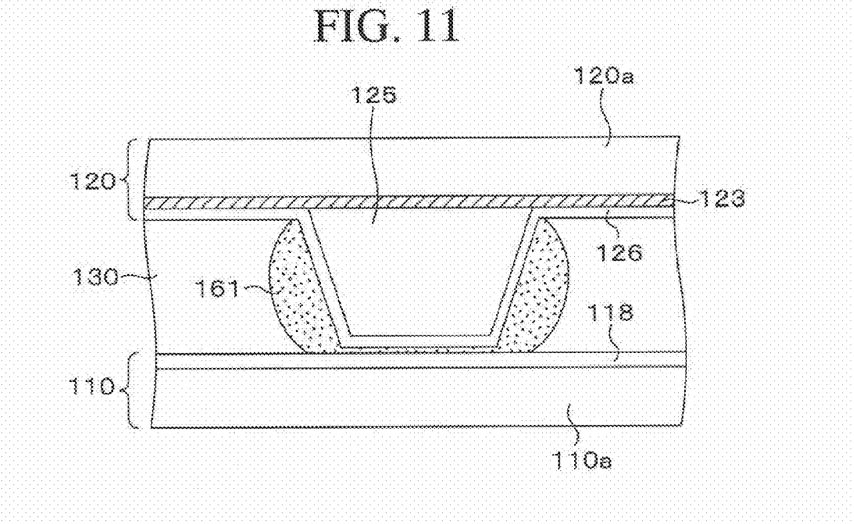
FIG. 11 is a view which shows a liquid crystal display device of a third embodiment of the present invention and which shows a state of joining using an adhesive applied to an apex of a spacer.

A sealant is applied to either one of the TFT substrate and the opposing substrate; and thereafter the TFT substrate and the opposing substrate are overlapped, and processed in vacuum by heat at high temperature (100 to 220 degrees Celsius) under pressure so that adhesive is set. Accordingly, as shown in a schematic view of FIG. 11, the TFT substrate 110 and the opposing substrate 120 are joined using adhesives 161 in the edges of the spacers 125 and the vicinities thereof. In FIG. 11, the drawings of gate bus lines, data bus lines, insulating films, black matrices, color filters, and the like are omitted.

Then, as in the same way as that of the first embodiment, liquid crystals are sealed between the TFT substrate 110 and the opposing substrate 120; polarizing plates, a backlight, and the like are fastened; and, thus, a liquid crystal display device of the present embodiment is completed.

In the present embodiment, the same effects as those of the first embodiment can be obtained; and in addition, since the TFT substrate 110 and the opposing substrate 120 are joined using adhesives 161 in the edges of the spacers 125 and the vicinities thereof, another effect can be obtained that the area of joining of the TFT substrate 110 and the opposing substrate 120 is large, and the TFT substrate 110 and the opposing substrate 120 can be joined more firmly.

Fourth Embodiment

A fourth embodiment of the present invention is described hereinafter.

Figure 12:
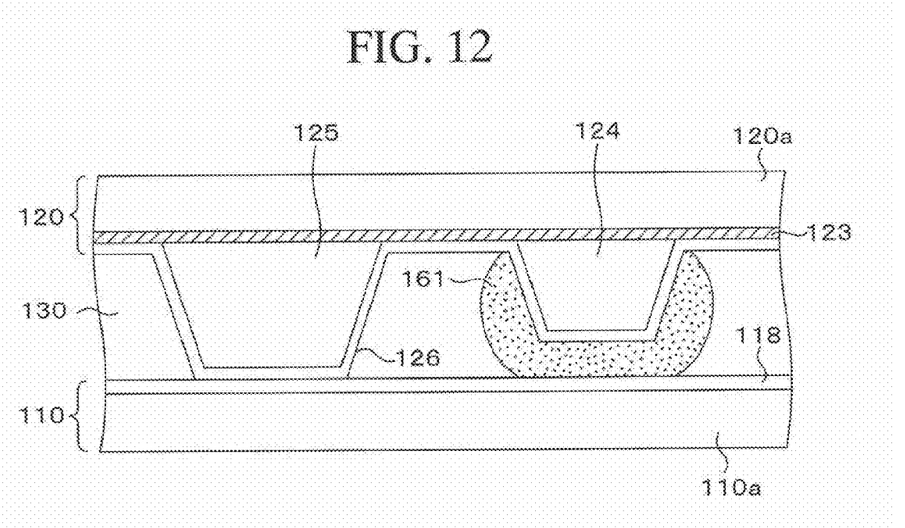
FIG. 12 is a view which shows a liquid crystal display device of a forth embodiment of the present invention and which shows a state of joining using an adhesive applied to a part of a protrusion for alignment control.

In the third embodiment, description is made in the case where adhesives are applied to the edges of the spacers, and however, in the present embodiment, as shown in a schematic view of FIG. 12, an adhesive (thermosetting resin) is applied to a part of a protrusion 124 for alignment control using an ink-jet printer.

When adhesives are applied to the edges of the spacers 125 as in the third embodiment, the cell gap may happen to be deviated from a predetermined value due to adhesives interposed between the spacers 125 and the TFT substrate 110. In the present embodiment, however, no adhesives are interposed between the spacers 125 and the TFT substrate 110, and hence the cell gap can be set to a predetermined value. Incidentally, in the present embodiment, although an adhesive is applied to portions which are not covered with the black matrices, portions where the protrusions 124 for alignment control are disposed become borders for domains and almost no light passes; and therefore the reduction of an aperture ratio which occurs due to use of the adhesives is quite small.

In the present embodiment, too, the same effects as those of the first embodiment can be obtained that the TFT substrate 110 and the opposing substrate 120 are not displaced even when a force is exerted on a liquid crystal panel with a finger or the like, and favorable display quality can be constantly maintained.

Fifth Embodiment

A fifth embodiment of the present invention is described hereinafter.

Figure 13:
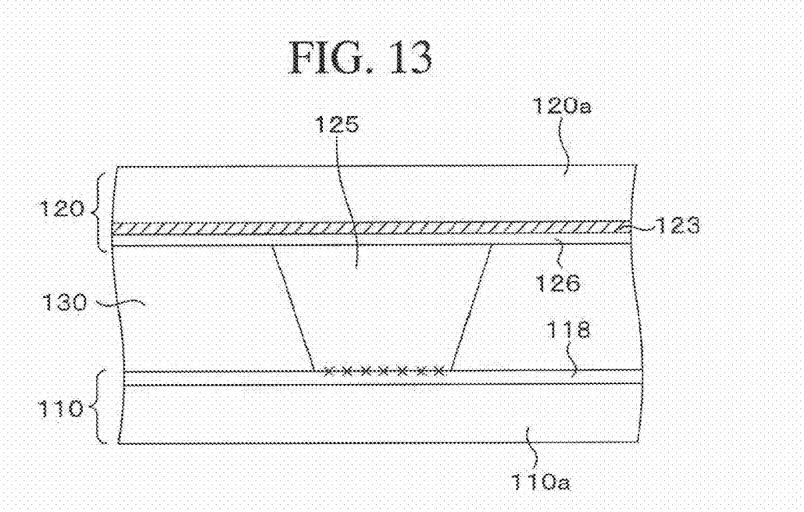
FIG. 13 is a schematic sectional view showing a method of manufacturing a liquid crystal display device of a fifth embodiment of the present invention.

FIG. 13 is a schematic sectional view showing a method of manufacturing a liquid crystal display device of a fifth embodiment of the present invention. In FIG. 13, the drawings of gate bus lines, data bus lines, insulating films, black matrices, color filters, and the like are omitted.

The present embodiment is different from the first embodiment in a method of joining a TFT substrate and an opposing substrate on portions where spacers are disposed, and other constitutions are basically the same as those of the first embodiment, hence omitting description for the same part.

In the present embodiment, as in the first embodiment, on (under in FIG. 13) the glass substrate 120a which becomes a base for the opposing substrate 120, black matrices, color filters, and the common electrode 123 are formed. Thereafter, photoresist is applied to the common electrode 123, and protrusions for alignment controls are formed through the processes of an exposure and development. In the first embodiment, the protrusions for alignment control and the spacers are formed simultaneously; and however, in the present embodiment, spacers are formed in a process to be described later.

Next, polyimide is applied to the entire upper surface of the glass substrate 120a; the polyimide thus applied is burned at a temperature of 220 degrees Celsius; and a vertical alignment film 126 is formed.

Next, a resist is applied to the alignment film 126, and column-like spacers 125 are formed through the processes of an exposure and development. However, the resist is herein maintained semi-setting without performing a post-bake. As in the first embodiment, the spacers 125 are formed at positions facing to regions where the gate bus lines and the data bus lines cross. In this way, the opposing substrate 120 is formed.

On the other hand, as in the same way as that of the first embodiment, the TFT substrate 110 is manufactured which has the vertical alignment film 118 being processed with a pre-bake treatment only. A sealant is applied to either one of the TFT substrate 110 and the opposing substrate 120; and thereafter the TFT substrate 110 and the opposing substrate 120 are overlapped, and heated in vacuum under pressure at high temperature (for example, 220 degrees Celsius) which is higher than the glass transition temperature of the resist (normally, on the order of 130 to 180 degrees Celsius). Thus, as shown in FIG. 13, the edges of the spacers 125 and the alignment film 118 on the side of the TFT substrate 110 are joined.

Then, as in the same way as that of the first embodiment, liquid crystals are sealed between the TFT substrate 110 and the opposing substrate 120; polarizing plates, a backlight, and the like are fastened; and, thus, a liquid crystal display device of the present embodiment is completed. Also, in the present embodiment, the same effects as those of the first embodiment can be obtained.

Although any one of the first to the fifth embodiment described above is described in the case where the present invention is applied to an MVA liquid crystal display device, the present invention can be, as a matter of course, applied to one other than an MVA liquid crystal display device.

What is claimed is:

1. A liquid crystal display device which includes a first substrate and a second substrate being placed to face each other, and liquid crystals being sealed between the first substrate and the second substrate, comprising:

a first alignment film covering a surface of the first substrate on the side of the liquid crystals;

column-like spacers which are formed on a surface of the second substrate on the side of the liquid crystals, and maintaining a uniform distance between the first substrate and the second substrate; and a second alignment film covering surfaces of the spacers and covering a surface of the second substrate on the side of the liquid crystals; wherein the first alignment film and the second alignment film on apexes of the spacers are joined by intermolecular force bonding or chemical bonding; and the first alignment film is thinner on the apexes of the spacers than on another region.

2. The liquid crystal display device according to claim 1, wherein gate bus lines, data bus lines, a picture element electrode, and a thin film transistor are formed on the first substrate, the gate bus lines being supplied with scanning signals, the data bus lines being supplied with display signals, the picture element electrode being provided to every picture element region and divided by the gate bus lines and the data bus lines, and the thin film transistor being provided to the every picture element region and connected to the gate bus lines, the data bus lines, and to the picture element electrode;

a common electrode is formed on the second substrate along with the spacers in such a way that the common electrode faces the picture element electrode; and the first alignment film covers a surface of the picture element electrode, and the second alignment film covers surfaces of the spacers and a surface of the common electrode.

3. The liquid crystal display device according to claim 2, wherein the spacers are disposed at positions facing regions where the gate bus lines and the data bus lines cross.

4. The liquid crystal display device according to claim 1, wherein the liquid crystals are of negative dielectric anisotropy.

5. The liquid crystal display device according to claim 4, wherein, further, structures for alignment control for achieving multi-domains are provided on at least one of the first substrate and the second substrate.

6. A method of manufacturing a liquid crystal display device, comprising steps of:

forming a first electrode on a first substrate;

applying a thermosetting material over the entire upper surface of the first substrate;

performing a first heat treatment to the first substrate at a first temperature lower than a temperature at which the thermosetting material is set;

forming a second electrode on a second substrate;

forming column-like spacers on the second substrate;

forming a second alignment film over the entire upper surface of the second substrate;

overlapping the first substrate and the second substrate with abutting apexes of the spacers to the first substrate, and, by performing a second heat treatment at a second temperature higher than the first temperature, setting the thermosetting material to form a first alignment film over the entire upper surface of the first substrate, and joining the second alignment film on the apexes of the spacers and the first alignment film by intermolecular force bonding or chemical bonding; and sealing liquid crystals between the first substrate and the second substrate.

7. A method of manufacturing a liquid crystal display device, comprising steps of:

forming gate bus lines, data bus lines, a picture element electrode, and a thin film transistor on a first substrate, the gate bus lines being supplied with scanning signals, the data bus lines being supplied with display signals, the picture element electrode being provided to every picture element region which is divided by the gate bus lines and the data bus lines, and the thin film transistor being provided to every picture element region and connected to one of the gate bus lines, one of the data bus lines, and the picture element electrode;

forming a first alignment film, which covers a surface of the picture element electrode, over the entire upper surface of the first substrate;

forming a common electrode, which faces the picture element electrode, on a second substrate;

forming column-like spacers at a position facing regions where the gate bus lines and the data bus lines are located on the second substrate;

forming a second alignment film over the entire upper surface of the second substrate;

applying an adhesive to apexes of the spacers, or to portions on the first substrate, the portions being in contact with the apexes of the spacers;

overlapping the first substrate and the second substrate with abutting the apexes of the spacers to the first substrate, and joining the first substrate and the second substrate using the adhesive; and sealing liquid crystals between the first substrate and the second substrate.

8. A liquid crystal display device which includes a first substrate and a second substrate which are placed to face each other, and liquid crystals which are sealed between the first substrate and the second substrate, comprising:

a first alignment film covering a surface of the first substrate on the side of the liquid crystals;

column-like spacers formed on a surface of the second substrate on the side of the liquid crystals, and which maintain a uniform distance between the first substrate and the second substrate;

a protrusion for alignment control which is formed on at least one of the first substrate and the second substrate, the protrusion being lower than the spacers; and an adhesive which is applied to a part of the protrusion for alignment control, and which joins the first substrate and the second substrate.

9. A method of manufacturing a liquid crystal display device, comprising steps of:

forming a first electrode on a first substrate;

forming a first alignment film over the entire upper surface of the first substrate;

forming a second electrode on a second substrate;

forming a protrusion for alignment control on the second electrode, the protrusion being lower than spacers defining a cell gap;

forming a second alignment film which covers surfaces of the second electrode and the protrusion for alignment control;

applying an adhesive to a part of the protrusion for alignment control; and overlapping the first substrate and the second substrate with the spacers interposed therebetween, and joining the first substrate and the second substrate using the adhesive.

10. A liquid crystal display device which includes a first substrate and a second substrate which are placed to face each other, and liquid crystals which are sealed between the first substrate and the second substrate, comprising:

gate bus lines which are formed on the first substrate, and which are supplied with scanning signals;

data bus lines which are formed on the first substrate, and which are supplied with display signals;

a picture element electrode which is formed on the first substrate, which is provided to every picture element region, and which is provided to every picture element region which is divided by the gate bus lines and the data bus lines;

a thin film transistor which is formed on the first substrate, and which is connected to one of the gate bus lines, one of the data bus lines, and the picture element electrode;

a first alignment film covering a surface of the first substrate on the side of the liquid crystals;

a common electrode which is formed on the second substrate and which faces the picture element electrode;

a second alignment film which is formed on the common electrode, and which covers a surface of the second substrate on the side of the liquid crystals; and column-like spacers which are formed at positions facing regions where the gate bus lines and the data bus lines cross on the second alignment film, and which maintain a uniform distance between the first substrate and the second substrate; wherein apexes of the spacers and the first alignment film are joined by intermolecular force bonding or chemical bonding.

11. A method of manufacturing a liquid crystal display device, comprising steps of:

forming gate bus lines, data bus lines, a picture element electrode, and a thin film transistor on a first substrate, the gate bus lines being supplied with scanning signals, the data bus lines being supplied with display signals, the picture element electrode being provided to every picture element region which is divided by the gate bus lines and the data bus lines, and the thin film transistor being provided to every picture element region and connected to one of the gate bus lines, one of the data bus lines, and the picture element electrode;

forming a first alignment film, which covers a surface of the picture element electrode, over the entire upper surface of the first substrate;

forming a common electrode, which faces the picture element electrode, on a second substrate;

forming a second alignment film, which covers a surface of the common electrode, over the entire upper surface of the second substrate;

forming column-like spacers at positions facing regions where the bus gate bus lines and the data bus lines cross on the second alignment film by using resin; and overlapping the first substrate and the second substrate with the spacers interposed therebetween, and, by performing a heat treatment at a higher temperature than a glass transition temperature of the resin, joining apexes of the spacers and the first alignment film by intermolecular force bonding or chemical bonding.

* * * * *

UNITED STATES PATENT AND TRADEMARK OFFICE
CERTIFICATE OF CORRECTION

PATENT NO. : 7,586,579 B2 Page 1 of 1
APPLICATION NO. : 11/419339
DATED : September 8, 2009
INVENTOR(S) : Takagi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Fourteenth Day of September, 2010

David J. Kappos
*Director of the United States Patent and Trademark Office*